US006268451B1

(12) United States Patent
Faust et al.

(10) Patent No.: US 6,268,451 B1
(45) Date of Patent: Jul. 31, 2001

(54) SILYL-FUNCTIONAL PSEUDO-TELECHELIC POLYISOBUTYLENE TERPOLYMERS

(75) Inventors: Rudolf Faust, Lexington; Savvas E. Hadjikyriacou, Lowell, both of MA (US); Toshio Suzuki, Midland, MI (US)

(73) Assignees: University of Massachusetts Lowell, Lowell, MA (US); Dow Corning Corporation Lowell, Midland, MI (US)

( * ) Notice: Subject to any disclaimer, the term of this patent is extended or adjusted under 35 U.S.C. 154(b) by 0 days.

(21) Appl. No.: 09/677,744

(22) Filed: Oct. 3, 2000

(51) Int. Cl.[7] .................................................. C08F 230/08
(52) U.S. Cl. ....................... 526/279; 526/135; 526/185; 526/238; 525/326.5; 525/384; 524/547
(58) Field of Search ..................... 526/279, 135, 526/185, 238; 525/326.5, 384; 524/547

(56) References Cited

U.S. PATENT DOCUMENTS

| | | | |
|---|---|---|---|
| 4,524,187 | 6/1985 | Greco et al. | 525/332.1 |
| 4,829,130 | 5/1989 | Liechelli et al. | 525/384 |
| 4,904,732 | 2/1990 | Iwahara et al. | 525/100 |
| 5,247,021 | 9/1993 | Fujisawa et al. | 525/254 |
| 5,260,378 | 11/1993 | Gandini et al. | 525/156 |
| 5,478,899 | 12/1995 | Bening | 526/84 |
| 5,527,870 * | 6/1996 | Maeda et al. | 526/279 X |

OTHER PUBLICATIONS

6001 Chemical Abstracts, 118 (993) Feb. 8, No. 6, p. 14, Columbus, Ohio USA.
Polymeric Materials Science and Engineering, Vol. 72, "Direct Initiation in Carbocationic Polymerization,"Robert Faust, et. al., University of Massachusetts Lowell.
Journal of Organometallic Chemistry, 156 (1978) 55–64, "Organoaluminum Chemistry and Its Application to the Initiation of Carbenium Ion Polymerization,"S. Sivaram.
Advances in Polymer Science, "Cationic Olefin Polymerization Using Alkyl Halide Alkylaluminum Initiator Systems,"Joseph P. Kennedy, et. al., pp. 83–111,.
Journal of the American Chemical Society, "Alkylation of Tertiary Alkyl Halides with Trialkylaluminums. A Model for Initiation and Termination in Cationic Polymerizations,"J.P. Kennedy, et. al. pp. 6386–6390.
Journal of Polymer Science: Polymer Chemistry Edition, vol. 17, 2129–2136 (1979). Cationic Polymerization of a–Methylstyrene from Polydienes. I. synthesis and Characterization of Poly(butadiene–g–a–Methylstyrene) Copolymers, R.J. Ambrose and J.J. Newell.
Advances in Polymer Science, 43, 1, (1982). Carbocationic Synthesis and Characterization of Polyolefins with Si–H and Si–Cl Head Groups. J.P. Kennedy, et. al. pp. 1–50.

\* cited by examiner

*Primary Examiner*—Fred Teskin
(74) *Attorney, Agent, or Firm*—Alex Weitz

(57) ABSTRACT

A method for preparing a moisture-curable, pseudo-telechelic, silyl-functional polyisobutylene terpolymer is disclosed, said method comprising reacting, in the presence of a Lewis acid and a solvent,
(A) an isobutylene monomer;
(B) a isopropenylphenyl comonomer having the formula

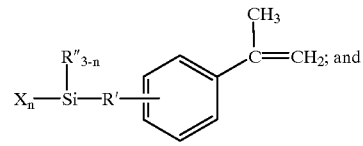

(C) a vinylphenyl comonomer of the formula

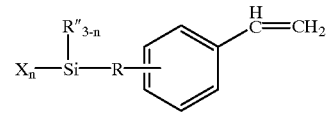

wherein R' is a divalent non-aromatic hydrocarbon group having 2 to 6 carbon atoms, R" is independently selected from alkyl groups having 1 to 10 carbon atoms or aryl groups having 6 to 10 carbon atoms, R is a divalent non-aromatic hydrocarbon group having 2 to 6 carbon atoms, X is independently a hydrolyzable group and n is independently 1, 2 or 3, with the proviso that $r_{AC}$ is greater than 1 and $r_{AB}$ is less than 1, wherein $r_{AB}$ is the reactivity ratio of said isobutylene in the presence of said comonomer (B) and said solvent and $r_{AC}$ is the reactivity ratio of said isobutylene in the presence of said comonomer (C) and said solvent.

20 Claims, 1 Drawing Sheet

SILYL-FUNCTIONAL PSEUDO-TELECHELIC POLYISOBUTYLENE TERPOLYMERS

FIELD OF THE INVENTION

The present invention relates to a method for preparing a room temperature vulcanizable polyisobutylene polymer. More particularly, the invention relates to a method for synthesizing a pseudo-telechelic polyisobutylene terpolymer having hydrolyzable silyl-functional groups statistically positioned near molecular chain ends, said polymer being prepared by a terpolymerization process wherein isobutylene, and two different silyl-functional monomers are reacted in the presence of a Lewis acid.

BACKGROUND OF THE INVENTION

Both silicone and organic polymers which contain reactive functional groups are known in the art. Of commercial interest are polyisobutylene (PIB) systems containing hydrolyzable silyl groups since they can be used to formulate moisture-curable sealants, caulks and adhesives, inter alia. Unlike the well known moisture-curable silicone room temperature vulcanizable (RTV) compositions, systems based on polymers having a PIB backbone offer the advantage of low permeability, making them eminently suitable for gas barrier applications such as formed-in-place gaskets, O-rings, rubber plugs/seals, and the like. In these PIB polymers it is particularly desirable that the functional groups reside at each end of the molecular chain. Such telechelic polymers offer an advantage in that the molecular weight between reactive groups can be controlled. Consequently, when a telechelic polymer is cured, the molecular weight between crosslinks (i.e., the network structure) and, therefore, ultimate mechanical properties of the product, can be controlled and essentially no "dangling" ends remain.

For example, U.S. Pat. No. 4,904,732 to Iwahara et al. discloses, inter alia, the preparation of a silyl-functional PIB polymer by hydrosilating a corresponding polymer which contains unsaturated groups. The resulting polymer can have an essentially telechelic structure and can be cured (e.g., by exposure to moisture). However, the total process suggested by Iwahara et al. is quite complicated and, therefore, expensive.

Using a different approach, U.S. Pat. No. 4,829,130 to Licchelli et al. discloses a method for preparing silylated copolymers of isobutylene which are crosslinkable upon exposure to moisture. In this case, isobutylene is copolymerized with a comonomer having a vinylic group attached to a silylalkyl group through a benzene ring connecting group. Ostensibly, the product of this statistical copolymerization is a polyisobutylene having pendant silyl-functional groups along its main chain and, although the process is relatively uncomplicated, the location of functional groups can not be controlled and the products are inherently inferior to silyl functional telechelic polymers.

Likewise, U.S. Pat. No. 4,524,187 to Greco et al. teaches crosslinkable polyisobutylene copolymers having pendant silyl functionality. In this case, isobutylene is first reacted with a triene compound to form a copolymer having pendant vinyl groups, the latter then being silylated with a moisture-reactive hydridosilane or mercapto-functional silane. Again, control of functional group distribution is not possible.

Thus, there is still a need for simpler means of synthesizing a silyl-functional polyisobutylene which can be readily cured by exposure to moisture to form a crosslinked elastomer having properties which approach those of the corresponding telechelic system.

SUMMARY OF THE INVENTION

We have shown that polymers prepared according to the teachings of Licchelli et al., cited supra, do not exhibit a random distribution of silyl-functional groups, as implied by the disclosed process. Thus, when the reactivity ratio (i.e., the ratio of homo-propagation rate constant to cross-propagation rate constant) for the system comprising isobutylene and silyl-functional monomer is approximately 1, and the concentration of the silyl-functional monomer is much lower than that of isobutylene, the functional groups will be randomly distributed along the chain and the distribution of copolymer composition (i.e., molecule-to-molecule variation) will be narrow. However, when this ratio is significantly different from 1, as under the conditions described by Licchelli et al., there is a copolymer composition drift with conversion, and homo-polyisobutylene (not containing any silyl functionality) may also form at low or high conversion. Further, under these circumstances, the silyl functionality tends to congregate at one end of the polymer, resulting in a considerable presence of "dangling" ends having no functionality. This, in turn, leads to inferior mechanical properties, and greater surface tack, when the polymer is cured. These factors could explain the relatively low gel contents reported by Lichelli et al.

We have now found that, unlike the copolymers of Licchelli et al. and Greco et al., a pseudo-telechelic, silyl-functional polyisobutylene terpolymer can be prepared by reacting isobutylene, a comonomer derived from an isopropenyl-functional benzene and a comonomer derived from a vinyl-functional benzene in the presence of a Lewis acid. Unlike the copolymers disclosed in the above cited art, the terpolymers of the present invention exhibit a high gel content when cured (i.e., low extractables).

As used herein, the term "pseudo-telechelic" denotes a terpolymer having one type of reactive silyl-functional unit statistically concentrated near the head of the terpolymer chain and a slightly different type of reactive silyl-functional unit statistically concentrated at the tail of the terpolymer. This definition does not, of course, exclude the presence, albeit to a considerably lesser extent, of either of the above functional groups near the middle of the chain. This surprising result was only observed when the terpolymer was synthesized in a solvent medium wherein the reactivity ratio for the system isobutylene/vinylphenyl comonomer (described infra) is greater than 1 and the reactivity ratio of the system isobutylene/isopropenylphenyl comonomer (also described infra) is less than 1. Moreover, a collateral benefit of the instant method is that the molecular weight of the resulting pseudo-telechelic terpolymer can be controlled by adjusting the amount of the isopropenylphenyl comonomer (B). Again, this is desired as a means of controlling the viscosity of formulated, e.g., sealant products such that the latter can be readily applied in the field.

The present invention, therefore, relates to a method comprising reacting, in the presence of a Lewis acid and a solvent, (A) an isobutylene monomer;

(B) an isopropenylphenyl comonomer having the formula

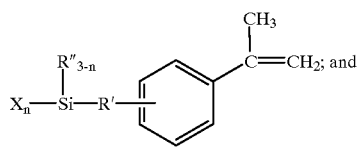

(C) a vinylphenyl comonomer of the formula

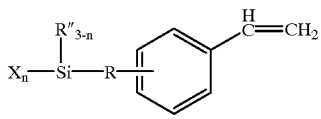

wherein R' is a divalent non-aromatic hydrocarbon group having 2 to 6 carbon atoms, R" is independently selected from alkyl groups having 1 to 10 carbon atoms or aryl groups having 6 to 10 carbon atoms, R is a divalent non-aromatic hydrocarbon group having 2 to 6 carbon atoms, X is independently a hydrolyzable group and n is independently 1, 2 or 3, with the proviso that $r_{AC}$ is greater than 1 and $r_{AB}$ is less than 1, wherein $r_{AB}$ is the reactivity ratio of said isobutylene in the presence of said comonomer (B) and said solvent and $r_{AC}$ is the reactivity ratio of said isobutylene in the presence of said comonomer (C) and said solvent.

The invention further relates to the pseudo-telechelic silyl-functional terpolymer prepared by the above method.

DETAILED DESCRIPTION OF THE INVENTION

Figure 1:
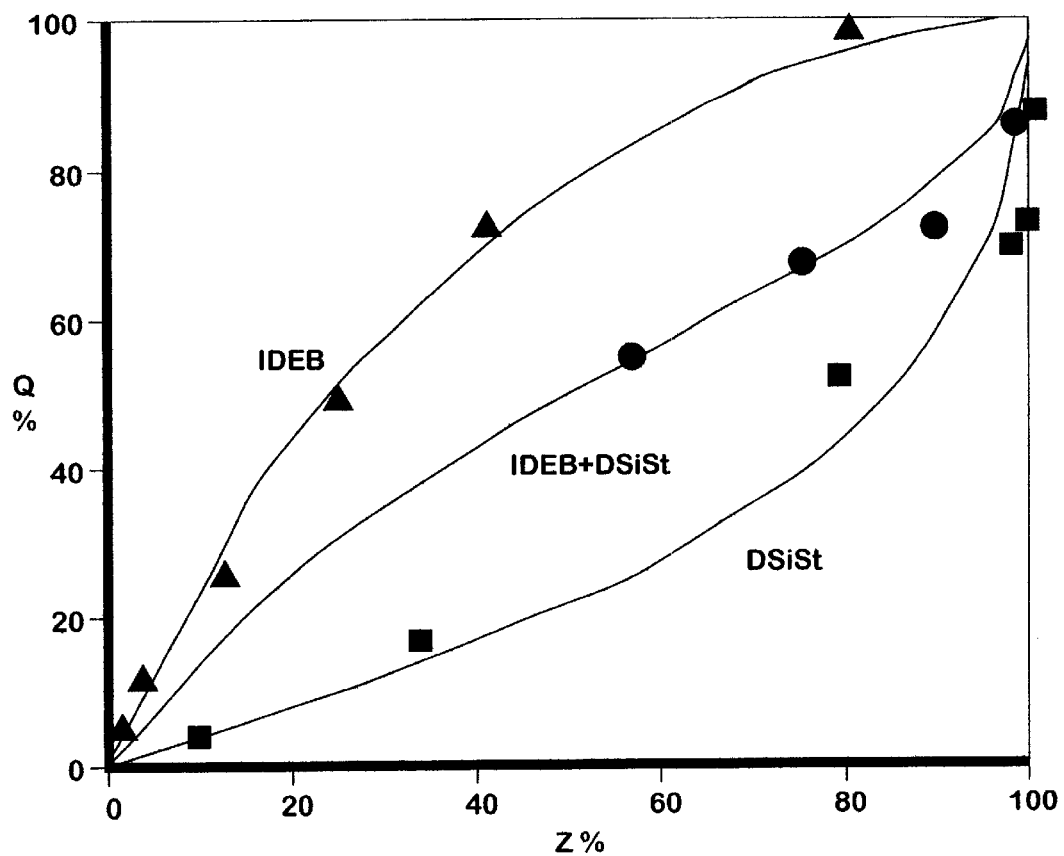
FIG. 1 is a plot of the mole percent of monomer consumed (Q) during copolymerization and terpolymerization of isobutylene versus weight percent conversion (Z).

Component (A) of the present invention is a monomer consisting essentially of isobutylene and may be either a substantially pure isobutylene (IB) monomer or a mixture of isobutylene with up to 20 mole percent of one or more unsaturated hydrocarbon monomers, such as 1-butene, 2-butene, $C_4$ feedstock, isoprene, styrene, α-methylstyrene or p-methylstyrene. These mixtures having a minor proportion of the above mentioned monomers are also referred to as "isobutylene" for the purposes herein. Preferably, component (A) is substantially pure (i.e., distilled) IB.

The reactive isopropenylphenyl comonomer (B) of the present invention is represented by the formula

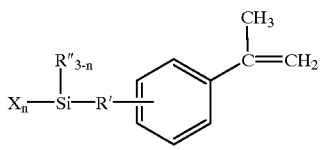

wherein R' is a divalent non-aromatic hydrocarbon group having 2 to 6 carbon atoms, R" is selected from alkyl groups having 1 to 10 carbon atoms or aryl groups having 6 to 10 carbon atoms, X is a hydrolyzable group and n is 1, 2 or 3. Specific examples of R" include methyl, ethyl, propyl, isopropyl, n-butyl, isobutyl, n-octyl, 2-ethylhexyl, n-nonyl, n-decyl, phenyl and tolyl, methyl being preferred. The group R' is exemplified by —CH₂—CH₂—, —CH(Me)—, —CH₂CH₂CH₂—, —CH₂—C(Me)₂— and —CH₂=CH₂—, and is preferably —CH₂CH(Me)—, wherein Me hereinafter represents a methyl group. Specific examples of X are halogen, alkoxy group, alkenoxy group, acyloxy group, oxime group and amido group. Preferably X is halogen or an alkoxy group with 1–4 carbon atoms. More preferably, X is chlorine. Further, the moieties attached to the benzene ring of formula (i) may be in ortho, meta or para positions with respect to one another, the latter two isomers being preferred.

In a highly preferred embodiment of the instant method, the isopropenylphenyl comonomer has the formula

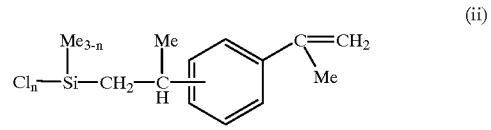

wherein n is 1, 2 or 3.

Comonomer (B) can be prepared by carrying out a hydrosilation reaction between a dialkenyl benzene species (or an alkenyl-alkynyl benzene species) and a silane, as illustrated below for a preferred system wherein R' is —CH₂CH(Me)—:

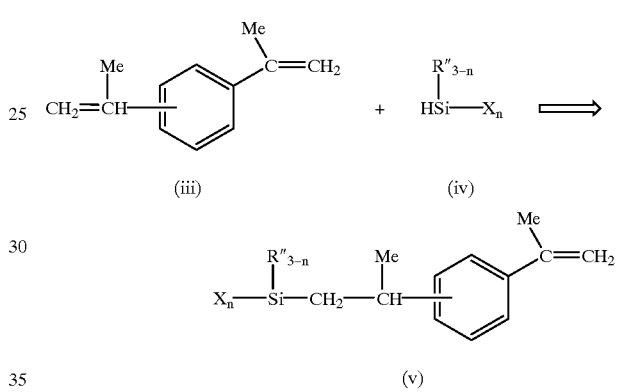

in which R", X and n are as defined above in connection with formula (i). In the above hydrosilation reaction, the molar ratio of component (iii) to component (iv) can be 0.3:1 to 10:1 but is preferably more than 1:1. More preferably, the ratio is 1:1 to 3:1. After the hydrosilation reaction, separation of the desired product (v) by a suitable method, such as fractional distillation, is recommended. In this case, it is highly preferred that a radical scavenger, such as phenothiazine, be added to the mixture to prevent polymerization of the product and starting materials.

Suitable catalysts for the hydrosilation reaction are platinum black, platinum metal on various solid supports (e.g., carbon), chloroplatinic acid, alcohol solutions of chloroplatinic acid, and complexes of chloroplatinic acid with liquid ethylenically unsaturated compounds such as olefins and organopolysiloxanes containing ethylenically unsaturated hydrocarbon radicals bonded to silicon. Preferred catalysts include a platinum complex catalyst produced by reacting chloroplatinic acid and divinyltetramethyldisiloxane, prepared according to U.S. Pat. No. 3,419,593 to Willing and a neutralized complex of platinous chloride and divinyltetramethyldisiloxane, prepared according to U.S. Pat. No. 5,175,325 to Brown et al. Most preferably, this catalyst is a neutralized complex of platinous chloride and divinyltetramethyldisiloxane. For this synthesis, the hydrosilation catalyst is generally employed at a level equivalent to a platinum concentration of from 0.1 to 1,000 parts by weight of platinum metal, preferably from to 1 to 100 parts by weight of platinum metal, per million weight parts (ppm) of the unsaturated component (iii).

The vinylphenyl comonomer (C) has the formula

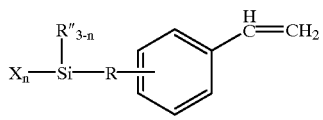

(vi)

wherein R", X and n are as defined above for component (B) and wherein each may be the same or different from the corresponding selection in (B). In formula (vi), R is a divalent, non-aromatic hydrocarbon group having 2 to 6 carbon atoms and may be selected from the same groups as R' of component (B). Again, the moieties attached to the benzene ring of formula (vi) may be in ortho, meta or para positions with respect to one another, the latter two isomers being preferred. It is preferred that R" is selected from methyl, ethyl or phenyl and X is chlorine or an alkoxy group. A particularly preferred vinylphenyl comonomer has the formula

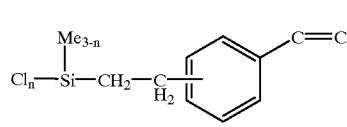

(vii)

wherein n is 1, 2 or 3.

The vinylphenyl comonomer is known in the art and may be prepared by a hydrosilation reaction between a vinylalkenyl benzene and the corresponding halosilane in the presence of a platinum catalyst, followed by separation by distillation, as described in connection with component (B).

Although not explicitly shown in the above formulae, the benzene ring of both components (B) and (C) may optionally be substituted with one or more hydrocarbon groups having 1 to 12 carbon atoms and having no aliphatic unsaturation. These hydrocarbon groups may be illustrated by alkyl groups such as methyl, ethyl, propyl, butyl, cycloaliphatic groups, such as cyclohexyl and cyclopentyl, and aromatic groups, such as phenyl. Preferably, neither (B) nor (C) contains such substitution.

The Lewis acid employed in the present invention is of the type known to catalyze cationic living (or non-living) polymerization of isobutylene. Examples of such Lewis acids include $BZ_3$, $TiZ_4$, $AlZ_3$, $SnZ_4$ and $ZnZ_2$, inter alia, wherein Z is independently selected from the group consisting of halogen, alkoxy having 1 to 4 carbon atoms and alkyl having 1 to 4 carbon atoms. Preferably Z is halogen, most preferably chlorine. Of course, those skilled in the art will recognize that a compound such as $TiZ_4$ in which all of the Z groups are alkyl groups is not a useful catalyst when living cationic polymerization is contemplated. The interested reader is referred to the article by Matyjaszewski and Pugh in *Cationic Polymerization Mechanism, Synthesis and Applications*, Matyjaszewski, Ed.; Marcel Dekker, New York (1996), for a review of suitable Lewis acids. Highly preferred Lewis acids include $Et_2AlCl$, $EtAlCl_2$, $Me_2AlCl$, $MeAlCl_2$, $TiCl_4$ and $BCl_3$, wherein Et hereinafter denotes ethyl group. These Lewis acids are known to induce polymerization of IB under suitable conditions and chain transfer and termination are either absent or occur only to a small extent, allowing the preparation of polymers of desired molecular weight. For the purposes of the present invention, it is preferred that the final terpolymer is a liquid rubber having the number average molecular weight of 1,000 to 100,000, more preferably 3,000 to 50,000.

In order to prepare a pseudo-telechelic, silyl-functional polyisobutylene terpolymer of the invention, components (A) through (C) are reacted in the presence of the Lewis acid and a solvent in a dry, inert atmosphere. The amount of components (B) and (C) can each range from 0.1 to 10 mole percent, preferably from 0.5 to 2 mole percent, based on the total monomer mix (i.e., components (A) through (C)). Such cationic polymerization of isobutylene is well known in the art, including typical reaction conditions and proportions of the monomer, optional initiator, Lewis acid, etc.

For the purposes of the present invention, the polymerization reaction is run in a dry, organic solvent solution wherein $r_{AC}$ is greater than 1, preferably greater than 2, and $r_{AB}$ is less than 1, preferably less than 0.6. Under these circumstances, we have found that there is a statistical concentration of silyl functionality near the ends of the final terpolymer. Herein, $r_{AB}$ is the reactivity ratio of isobutylene in the presence of comonomer (B) and the solvent and $r_{AC}$ is the reactivity ratio of isobutylene in the presence of comonomer (C) and the solvent. As used herein, each reactivity ratio has its conventional definition and, for example, $r_{AB}$ represents the ratio of the rate constant for homo-propagation of isobutylene to the rate constant for cross-propagation from IB to comonomer (B) for a given solvent, temperature and Lewis acid. Reactivity ratios for a given set of conditions may be determined by methods well known in the art. For the purposes of the invention, this is accomplished by employing a simplified version of the well known "copolymer composition equation" (e.g., see Section 22.1.2 of Elias, *Macromolecules*, Plenum Press, 1977 or Equation 6.12 in G. Odian, *Principles of Polymerization*, Third Ed., John Wiley and Sons, Inc. 1991). Thus, for example, when the concentration of comonomer (B) is much lower than that of the isobutylene (A), this equation simplifies to $$dM_A/dM_B = r_{AB}(M_A/M_B)$$

for the copolymerization of (A) and (B), wherein $M_A$ and $M_B$ represent the concentration of monomer (A) and comonomer (B), respectively and $r_{AB}$ is as defined above. The above equation is a good approximation as long as the concentration of comonomer (B) is less than about 5 mole percent with respect to monomer (A). Integration of this equation yields $$\ln(M_{A0}/M_A) = r_{AB} \ln(M_{B0}/M_B)$$

in which $M_{A0}$ and $M_{B0}$ represent the initial concentrations of monomer (A) and comonomer (B), respectively. Substituting the equalities $$(M_{A0}/M_A) = 1/(1-x_A) \text{ and } (M_{B0}/M_B) = 1/(1-x_B)$$

the fractional conversion of (B) can be expressed by $$x_B = 1 - (1-x_A)^{1/r_{AB}}$$

where $x_A$ and $x_B$ denote the fractional conversion of monomer (A) and comonomer (B), respectively. The reactivity ratio $r_{AB}$ can then be determined by a computer fit of a plot of measured values of $x_B$ versus $x_A$. In a like manner, the value of $r_{AC}$ can be determined using the same solvent system, temperature and catalyst. Alternatively, the Kelen-Tüdös method (Kelen et al., *J. Poly. Sci.-Polym. Chem. Ed.* 15, 3047, 1977) can be employed to determine reactivity ratios.

As further guidance in the selection of a solvent, we have discovered that the solvent (or solvent combination) preferably contains halogenated hydrocarbons or other polar solvents. That is, low polarity solvents, such as pure hexane, as illustrated by Licchelli et al., cited supra, do not give the desired effect. Examples of suitable polar solvents include methyl chloride, dichloromethane and other chlorinated hydrocarbon solvents and mixtures of the above with non-polar solvents such as butane, isobutene, pentane hexane, heptane and toluene. Preferred systems include dichloromethane, methyl chloride, and combinations thereof with hexane, particularly methyl chloride and mixtures of methyl chloride and hexane at a volume ratio of about hexane/methyl chloride of 40/60 to 60/40. It is preferred that the concentration of component (A) is 1 to 5 mole/liter in the reaction solution. Of course, these conditions will vary according to the particular ingredients under consideration and optimization of conditions and proportions needed to obtain a terpolymer having a desired molecular weight can be achieved through routine experimentation by those skilled in the art. For example, the interested reader is directed to the chapter by Sawamoto in *Cationic Polymerization Mechanism, Synthesis and Applications*, Matyjaszewski, Ed.; Marcel Dekker, New York (1996), the text by Kennedy and Ivan entitled *Designed Polymers by Carbocationic Macromolecular Engineering: Theory and Practice* published by Hanser (1992) and the text by Kennedy and Marechal entitled *Carbocationic Polymerization* published by John Wiley and Sons, Inc. (1982), the latter dealing with non-living systems.

After the desired conversion is attained, the polymerization is stopped by quenching the catalyst, as conventionally practiced in the art. For example, when X in formulae (i) and (vi) is chlorine, a tertiary amine such as pyridine may be used to quench the catalyst to preserve this functionality.

In one preferred embodiment, the terpolymer is formed under polymerization conditions wherein an isobutylene monomer is reacted with a known cationogenic initiator, a isopropenylphenyl comonomer of the formula (ii) and a vinylphenyl comonomer of the formula (vii) in the presence of $TiCl_4$. Examples of suitable cationogenic initiators include tert-alkyl halides, such as 2-chloro-2,4,4-trimethylpentane, cumyl chloride; tert-alkyl esters, such as 2,4,4-trimethylpentyl- and cumyl acetate, chloroacetate etc.; tert-alkyl ethers, such as cumyl methyl ether; and aromatic halides such as cumyl chloride. Preferably, the initiator is cumyl chloride or 2-chloro-2,4,4-trimethylpentane. A Lewis base, such as pyridine or its derivatives, such as 2,6-ditert-butyl-pyridine (DTBP) or lutidine, is preferably included in the polymerization mixture in order to prevent initiation by protic impurities. However, this is usually not necessary when the concentration of adventitious protic impurities is less then about 0.002 molar (M), based on total solution, and the desired molecular weight is under 50,000 (e.g., see M. Gyor, H-C. Wang and R. Faust, *J Macromol. Sci.*, A29(8), 639, 1992). The reaction is carried out in a solvent, preferably a combination of methyl chloride and hexanes in a volume ratio of about 60/40 to 40/60, under dry conditions and at a temperature of $-100°$ C. to $0°$ C., preferably $-80°$ C. to $-60°$ C. Preferably, the order of addition is solvent, initiator, monomers and Lewis acid, or the order of the last two components may be reversed. The concentrations of the initiator and $TiCl_4$ are preferably about $10^{-3}$ to $10^{-1}$ M and $10^{-3}$ to $10^{-2}$M, respectively, based on the total solution, while the molar content of DTBP is adjusted to be equal to or greater than that of any protic impurity. Typically, this terpolymerization reaction is completed within about 3 minutes to 3 hours.

In another preferred embodiment, an adventitious proton source, such as water or HCl, may serve as the initiator. In this case, there is no need to include a Lewis base. Further, since the concentration of adventitious proton source is usually unknown and the efficiency of initiation may be low, the molecular weight of the terpolymer must be controlled in a different way. We have discovered that this molecular weight can be controlled by adjusting the amount of component (B). In a preferred version of the second embodiment, isobutylene is reacted with an isopropenylphenyl comonomer of the formula (ii) and a vinylphenyl comonomer of the formula (vii) in the presence of $EtAlCl_2$. This reaction is preferably carried out at 0 to $-100°$ C., more preferably $-60$ to $-90°$ C., in a solvent, as described above in connection with the preferred version of the first embodiment.

In the instant method, the resulting pseudo-telechelic terpolymer contains silyl-functionality derived from isopropenylphenyl comonomer (B) which is concentrated mainly near the head of the terpolymer and silyl-functionality derived from vinylphenyl comonomer (C) which is concentrated mainly near the tail of the terpolymer. In preferred embodiments where halosilyl comonomers are used, this halosilyl functionality is converted to alkoxysilyl by reacting the terpolymer with an alcohol. During such an alcoholysis, the halogen groups on silicon are replaced by the corresponding alkoxy functionality. This reaction must be conducted under dry conditions so as not to prematurely hydrolyze either halogen or alkoxy groups. Typically, the reaction is carried out by adding the alcohol, which preferably has 1 to 4 carbon atoms, to a solution of the above described halosilyl-functional terpolymer 0 to $60°$ C., an excess of 100 to 1,000% of the alcohol over the stoichiometric amount being preferred. The final pseudo-telechelic alkoxysily-functional terpolymer may then be isolated from the reaction solution by conventional means, such as precipitation with a non-solvent.

In the case where alkoxysilyl functional comonomers are used, the above described alkoxylation step would not seem necessary. However, depending on the polymerization catalyst, the alkoxy groups attached to silicone often undergo alkoxy-halogen exchange reactions, said halogen atoms being provided by the Lewis acid catalyst. Therefore, the alkoxylation step may still be needed.

The reactive silyl-functional pseudo-telechelic terpolymers of the present invention can be cured by exposure to moisture and can therefore be employed as base polymers in the formulation of sealants, adhesive and coatings when combined with the appropriate filler, plasticizers and catalysts, inter alia. When cured, these formulated compositions can be used as formed-in-place gaskets, seals for insulating glass, and the like.

EXAMPLES

The following examples are presented to further illustrate the method of this invention, but are not to be construed as limiting the invention, which is delineated in the appended claims. All parts and percentages in the examples are on a weight basis and all measurements were obtained at room temperature (approximately $25°$ C.) unless indicated otherwise.

Example 1
Preparation of 1-isopropenyl-3-(1-dichloromethylsilylmethyl)ethyl-benzene (IDEB)

A 250 ml three neck round bottom reaction flask equipped with a thermometer, a condenser, a magnetic stirring bar, an addition funnel and argon gas inlet was charged with 60 ml of 1,3-diisopropenylbenzene (0.35 mole). This was followed by the addition (under argon) of 0.2 ml of a 10% solution of a platinum divinyldisiloxane complex in hexanes. This complex was SIP 6830.0 obtained from Gelest (Tullytown, Pa.) and contained 3–3.5% Pt in vinyl terminated polydimethylsiloxane. After injection of the catalyst, the argon inlet was replaced by a drying tube that contained Drierite™.

The reaction flask was warmed to 40° C. in an oil bath and a dropwise feed of $CH_3Cl_2SiH$ (30 ml; 0.29 mole) from the addition funnel was started. Reaction temperature was kept between 40° C. and 50° C. by adjusting the rate of addition of $CH_3Cl_2SiH$ and heat to the oil bath. After adding the silane, the temperature was kept at the above level for another 3 hours.

The flask was allowed to cool to room temperature and the addition funnel, drying tube and thermometer were removed and the condenser was replaced by a distillation head and argon inlet. Excess 1,3-diisopropenylbenzene was distilled out, followed by the distillation of the expected material, 1-isopropenyl-3-(1-dichloromethylsilylmethyl)ethyl-benzene (IDEB)

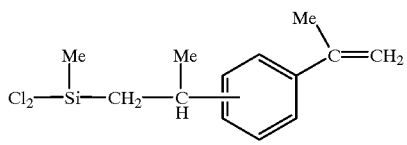

the structure of which was confirmed by $^1H$ NMR (nuclear magnetic resonance): 7.10–7.50 ppm (4H, m), 6.40 ppm (1H, s), 6.10 ppm (1H, s), 3.20 ppm (1H, m), 2.20 ppm (3H, s), 1.60 ppm (2H, d), 1.45 ppm (3H, d), 0.5 ppm (3H, s).

Example 2

Preparation of (2-dichloromethylsilyl-ethyl)styrene (DSiSt)

A 500 ml three-neck, round bottom flask equipped with a magnetic stirrer, a condenser and an addition funnel was charged with 60 ml (0.337 mol) of divinylbenzene (Aldrich Chemical Co., Milwaukee, Wis.); mixture of 80% m- and p-isomers and 20% ethylvinylbenzene) under an argon atmosphere and at room temperature (RT). While stirring, 200 ml of distilled and dried hexanes were added followed by 0.5 ml of the above described platinum catalyst solution (SIP6830.0 from Gelest). Dichloromethylsilane (39.0 ml; 0.371 mol) was placed in the addition funnel, the argon supply was disrupted and a drying tube was attached to the system. The dichloromethylsilane was added dropwise at room temperature and the reaction was monitored by $^1H$ NMR spectroscopy. After 48 hours, it was determined that hydrosilation was complete, the addition funnel and condenser were replaced by a distillation head and the crude product was purified by fractional distillation. The desired product was obtained as a mixture, 77% thereof corresponding to a combination of meta- and para-(2-dichloromethylsilyl-ethyl)-styrene (DSiSt) of the formula

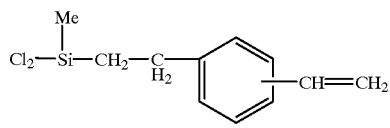

and 23% of the by-product (2-dichloromethylsilyl-ethyl)-ethyl-benzene.

Example 3

Terpolymerization of IB with IDEB and DSiSt

In the following examples, isobutylene (99% purity) and methyl chloride (99.5% purity) were dried by passing them through in-line gas purifier columns packed with BaO/Drierite™. These materials were condensed in a cold bath within a glove box prior to use. Hexanes solvent was refluxed for 24 hours with concentrated sulfuric acid, washed with 10% aqueous NaOH solution and then washed with distilled water until neutral. This solvent was stored over anhydrous sodium sulfate drying agent for 24 hours, refluxed for 24 hours over calcium hydride and distilled under nitrogen. Further, the volumes of IDEB, DiSiSt, hexanes and solutions in hexanes were measured at room temperature; IB, $CH_3Cl$ and solutions in $CH_3Cl$ were measured at −80° C.

Into a 500 ml round bottom flask equipped with a stirrer were placed 141.8 ml of hexanes, the flask cooled to —80 °C. and 90.8 ml of $CH_3Cl$ added. While stirring, 0.2 ml of DTBP dissolved in 10 ml of hexanes, 0.1083 g of 2,4,4-trimethyl-2-chloropentane (TMPCl) initiator dissolved in 20 ml of hexanes were added followed by 23.0 ml of IB, 0.39 ml of IDEB (from Example 1) and 0.44 ml of DSiSt (from Example 2; amount takes into consideration the above mentioned purity of 77%) diluted with 10 ml $CH_3Cl$ were introduced. The mixture was stirred for 5 minutes and the polymerization was started by the introduction of 1.19 ml of $TiCl_4$ dissolved in 15 ml of hexanes and 10 ml of $CH_3Cl$. The final concentrations of the reactants were as follows:

TMPCl=$2.44 \times 10^{-3}$ M; DTBP=$3 \times 10^{-3}$ M; $TiCl_4$=$3.6 \times 10^{-2}$ M; IB=0.990 M; IDEB=$5 \times 10^{-3}$ M; and DSiSt=$5 \times 10^{-3}$ M, wherein M denotes molarity based on total solution. Samples were removed at predetermined times, quenched with methanol and the terpolymers isolated by reprecipitation from anhydrous hexanes/methanol under a nitrogen atmosphere. The composition of each terpolymer so produced was analyzed by $^1H$ NMR spectroscopy as a function of total conversion. The mole percentage of total comonomers consumed Q vs. weight percent conversion (Z) is shown in FIG. 1 (circles).

Using identical conditions, a separate copolymerization between IB and IDEB was carried out wherein the concentration of IB was 0.995 M (molar) and the concentration of IDEB was $5 \times 10^{-3}$ M. The resulting copolymer was analyzed as above and the percentage of IDEB consumed vs. total conversion is also shown in FIG. 1 (triangles). In a like manner, copolymerization between IB and DSiSt was carried out wherein the concentration of IB was 0.995M and the concentration of DSiSt was $5 \times 10^{-3}$ M. The resulting copolymer was analyzed as above and the percentage of DSiSt consumed vs. total conversion is again shown in FIG. 1 (squares). As a further check, a calculated plot for the percent of (IDEB+DSiSt) consumed as a function of conversion was obtained by assuming that IDEB and DSiSt react independently of each other, this being a reasonable assumption given their very low concentrations relative to IB. Thus, at a given conversion, the sum of the comonomers consumed during terpolymerization (FIG. 1, middle curve) should equal the average of the two comonomers consumed during the copolymerizations (FIG. 1, upper and lower curves). As seen in FIG. 1, this predicted curve for the system (IB+IDEB+DSiSt) showed good agreement with experimental values for the terpolymer.

FIG. 1 clearly demonstrates the difference in reactivity between the two functional comonomers, IDEB and DSiSt. The former is far more reactive than IB and is therefore incorporated into the polymer at the early stages of polymerization while the latter is much less reactive than IB and adds mainly toward the end of the polymerization. This observation indicates that the statistical distribution of polymer units derived from IDEB are largely located at the head of the terpolymer while the units derived from DSiSt reside mainly near the PIB tail.

Further, the number average molecular weights ($M_n$) of similarly prepared terpolymer samples obtained at various stages of total conversion were determined by gel permeation chromatography (GPC) using universal calibration. One such series comprised IB:IDEB:DSiSt in a molar ratio of 99:0.5:0.5; in a second series, this molar ratio was 98:1.0:1.0, respectively. In each case, an essentially linear plot of $M_n$ versus percent conversion resulted, indicating that chain transfer was negligible and the molecular weight is controlled by the ratio of total monomer to initiator. A similar result was obtained when these IB was copolymerized with IDEB or with DSiSt.

In separate copolymerization experiments, the reactivity ratios for the systems (IB+IDEB) and (IB+DSiSt) were determined in the solvent indicated in the first column of Table 1 at total concentration of 2M (temperature=−80° C.) using the catalyst indicated in the second column. These reactivity ratios are shown in the third and fourth columns of this table, respectively.

TABLE 1

| Solvent System | Catalyst | $r_{AB}$ | $r_{AC}$ |
|---|---|---|---|
| Methyl Chloride (MeCl) | Dimethyl aluminum chloride | 0.6 | 2.9 |
| Hexanes/MeCl 60/40 v/v | Titanium tetrachloride | 0.28 | 3. 1 |
| Hexanes/MeCl 60/40 v/v | Ethyl aluminum dichloride (EADC) | — | 2.8 |
| Hexanes/MeCl 90/10 v/v | EADC | 0.26 | 0.9 |
| Hexanes | EADC | 0.21 | 0.54 | v/v = volume/volume.

From Table 1 it is seen that only solvent systems having some polar solvent result in a desirable value of $r_{AC}$ and $r_{AB}$. As illustrated above, such solvent systems result in terpolymers which exhibit the pseudo-telechelic distribution of silyl group according to the invention.

Example 4

Terpolymerization of IB with DSiSt and IDEB in Hexanes/$CH_3Cl$ (60/40, v/v) at −80° C.

Hexanes, $CH_3Cl$, DSiSt (from Example 2), IDEB (from Example 1), and IB were mixed (order as indicated) in seven culture tubes at −80° C., the total reaction volume for each sample being 20 ml. Polymerization was started by adding 1 ml of ethyl aluminum dichloride (EADC) stock solution (0.126 ml EADC diluted with 40.4 ml of hexanes and 24 ml $CH_3Cl$). The final concentrations were as follows:

EADC=$1.0\times10^{-3}$ M (molar); DSiSt=$5.0\times10^{-3}$ M; IDEB=(as indicated in first column of Table 2); IB=(1−conc. DSiSt−conc. IDEB).

After 15 minutes, the polymerization was quenched with prechilled methanol. The polymers were purified by reprecipitation from anhydrous hexanes/methanol under a nitrogen atmosphere and the number average molecular weight determined by GPC (tetrahydrofuran as solvent, universal calibration). These results are also presented in Table 2.

TABLE 2

| IDEB Concentration (molar) | $M_n$ |
|---|---|
| 0 | 166000 |
| $5.0 \times 10^{-3}$ M | 20000 |
| $1.0 \times 10^{-2}$ M | 10400 |
| $1.5 \times 10^{-2}$ M | 8400 |
| $2.0 \times 10^{-2}$ M | 6600 |
| $2.5 \times 10^{-2}$ M | 5700 |
| $3.0 \times 10^{-2}$ M | 5300 |

From Table 2 it can be seen that adjustment of the amount of IDEB in the polymerization with IB and DSiSt can be used to conveniently control the molecular weight of the final silyl-functional terpolymer.

Example 5

Terpolymerization of IB with DSiSt and IDEB in Hexanes/$CH_3Cl$ (60/40, v/v) at −80° C. using ethyl aluminum dichloride (EADC)

Hexanes (1,711 ml) were charged to a 5 liter round-bottom resin flask equipped with a twin turbine type Teflon™ stirrer. This was followed by the addition of a solution of IDEB prepared in Example 1 (7.8 ml of IDEB in 60 ml hexanes) and then a solution of of DSiSt prepared in Example 2 (9.5 ml in 60 ml hexanes). The mixture was cooled to −80° C. and 1,015 ml of $CH_3Cl$ were introduced, followed by 462 ml of IB (462 ml). The mixture was then stirred for 10 minutes. Polymerization was initiated by adding a solution of EADC (0.95 ml of EADC in 60 ml of hexanes). After 15 minutes, the polymerization was quenched with 200 ml of pre-chilled methanol. Final concentrations of the reactants were as follows:

IB=1.98 M; IDEB=$1\times10^{-2}$ M; DSiSt=$1\times10^{-2}$ M; EADC=$3\times10^{-3}$ M.

The resulting terpolymer was purified by reprecipitation from anhydrous hexanes/methanol under nitrogen. Solvent was evaporated on a rotary evaporator and 344 g of terpolymer, having $M_n$=28,000, $M_w/M_n$=1.8 and total comonomer content of IDEB+DSiSt=0.9 mol %, was isolated, the latter value being determined by $^1$H NMR spectroscopy.

Example 6

Terpolymerization of IB with DSiSt and IDEB in $CH_3Cl$ at −80° C. using ethyl aluminum dichloride (EADC)

A 5 liter three-neck, round-bottom flask equipped with an overhead stirrer was charged with 2,340 ml of methyl chloride at −80° C. To this solution, IDEB from Example 1 (7.8 ml, 0.01 M) and DSiSt from Example 2 (9.5 ml, 0.01 M) each dissolved into 60 ml of methyl chloride, were added. The mixture was stirred at −80° C. for about 30 minutes, whereupon 462 ml (1.98 M) of IB were introduced. The reaction mixture was stirred for another 30 minutes at −80° C. Polymerization was started by the adding 0.95 ml of EADC (0.003 M) dissolved in 60 ml of methyl chloride. After 30 minutes, the polymerization was quenched with pre-chilled methanol. Purification according to the description in Example 5 provided 350 g of a terpolymer having $M_n$=21,000, $M_w/M_n$=1.9 and a total comonomer content of (IDEB+DSiSt)=1.0 mol %.

Comparative Example 7

Terpolymerization of IB with DSiSt and IDEB in Hexanes at −80° C. using ethyl aluminum dichloride (EADC)

A 5 liter three-neck, round-bottom flask equipped with an overhead stirrer was charged with 2,653 ml of hexanes. To this solution, there was added IDEB from Example 1 (7.8 ml, 0.01 M) and DSiSt from Example 2 (9.5 ml, 0.01 M), each being dissolved in 60 ml of hexanes. This combination was cooled to −80° C. and 462 ml (1.98 M) of IB was introduced. The reaction mixture was stirred for 30 minutes and polymerization was started by adding 0.95 ml (0.003 M) of EADC dissolved in 60 ml of hexanes. After 30 minutes, the polymerization was quenched with pre-chilled methanol and the product was purified, as described above. This terpolymer (384 g) had $M_n$=49,000, $M_w/M_n$=2.6 and a total comonomer content of IDEB+DSiSt=0.9 mol %.

Examples 8–10

Two-part sealant compositions were formulated from the terpolymers prepared in Examples 5, 6 and (Comparative) Example 7 by mixing the ingredients listed in Table 3.

TABLE 3

| Ingredient | Parts by Weight |
|---|---|
| Part A | |
| Terpolymer | 100 |
| KP-32 | 80 |
| Socal ™ 312 | 150 |
| Methyltrimethoxysilane | 1 |
| A-1100 | 3 |
| Part B | |
| KP-32 | 20 |
| Gama Sperse ™ CS-11 | 3 |
| Wessalith-P ™ | 20 |
| K-kat ™ 8201 | 1 |

The ingredients in the above table are defined as follows:
KP-32 is a paraffin oil marketed by Apollo America Corp., Southfield, Mich.;
Socal™ 312 is a precipitated calcium carbonate filler marketed by Solvay Minerals Inc., Houston, Tex.;
A-1100 is silane adhesion promoter (3-aminopropyltriethoxysilane) marketed by CK Witco Corp., Endicott, N.Y.;
Gama-Sperse™ CS-11 is a ground calcium carbonate filler marketed by Georgia Marble Co., Kennesaw, Ga.;
Wessalith-P™ is a water-containing zeolite marketed by Degussa-Huls, Germany;
K-Kat™ 8201 is an organotin catalyst (dibutyltin bis(2,4-pentanedionate) marketed by King Industires, Norwalk, Conn.

Each part A of Table 3 was prepared in a Whipmix™ mechanical mixer and each part B was prepared using a Hauschild™ dental mixer. Parts A and B were then hand-mixed in a weight ratio of 7.6/1, respectively. this composition was formed into a sheet and then allowed to cure for seven days at room temperature. Physical properties of the cured film were measured according ASTM D412 and the results are shown in Table 4.

TABLE 4

| Terpolymer Prepared in: | Example 8 Example 5 | Example 9 Example 6 | (Comparative) Example 10 (Comparative) Example 7 |
|---|---|---|---|
| Tensile Strength (MPa) | 1.90 | 1.86 | 2.47 |
| Elongation (%) | 249 | 262 | 183 |
| 100% Modulus (MPa) | 0.67 | 0.59 | 1.24 |
| Hardness (Shore A) | 26 | 25 | 39 |

It is seen from Table 4 that despite the higher molecular weight of the terpolymer of (Comparative) Example 7 (using only hexanes as the solvent during synthesis), a sealant based thereon (Comparative Example 10) exhibited lower elongation and higher modulus than the two sealants of Examples 8 and 9 which were formulated with terpolymers of Examples 5 and 6, respectively. This further supports the conclusion that terpolymers of the present invention resemble telechelic systems while terpolymers prepared in hexanes exhibit a more random distribution of silyl functionality.

Example 11

The terpolymer prepared in Example 5 was mixed with K-Kat™ 8201 (3 wt %) and this mixture was cast into a thin film (less than 1 mm thickness). The film was allowed to moisture cure at room temperature for 2 weeks. The cured film was extracted in a Soxhlet tube (under reflux for 24 hr in hexane), this procedure resulting in an insoluble fraction (i.e., gel content) of 91% based on original sample weight.

For comparative purpose, a copolymer of only isobutylene and IDEB (1 mol %) was prepared in hexanes/MeCl (60 v/40 v) at −80° C. according to the method of Example 5. The resulting copolymer, which had $M_n$=13,100 and, $M_w/M_n$=2.5, was subjected to the above described extraction procedure and exhibited a gel content of only 80%. This improved curability further illustrates the advantages of the instant method.

Comparative Example 12

The procedures of Example 2 of the patent to Licchelli et al., cited supra, were followed in an attempt to copolymerize IB and DSiSt. The monomers and hexanes solvent were dried as described in Example 3 and the Lewis acid (AlCl$_3$; 99.99% from Aldrich Chemical Co.) was used without further purification. In this case, only methanol was used to quench the system instead of the methanol/propylene oxide combination employed by Licchelli et al. This reaction produced no polymeric product (i.e., only the volatile monomers remained). The above procedures were repeated wherein copolymerization of the system (IB+IDEB) was attempted. Again, no polymeric product was obtained.

The above procedures were again repeated wherein the neutralized hexanes solvent was dried only with anhydrous sodium sulfate (i.e, no calcium hydride, as described in Example 3). Again, no polymeric product was obtained for the systems (IB+DSiSt) or (IB+IDEB).

The above procedures were repeated wherein the hexanes solvent was not dried with anhydrous sodium sulfate or calcium hydride. Again, no polymer product was obtained with either DSiSt or IDEB as comonomer.

The above again illustrate the advantage of the instant method and the silyl-functional pseudo-telechelic terpolymers produced thereby over copolymers taught by Licchelli et al.

That which is claimed is:

1. A method for preparing a silyl-functional, pseudo-telechelic polyisobutylene terpolymer, said method comprising reacting, in the presence of a Lewis acid and a solvent, (A) an isobutylene monomer;

(B) an isopropenylphenyl comonomer having the formula

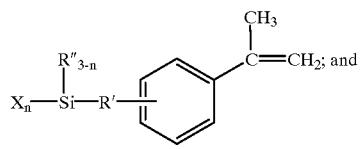

(C) a vinylphenyl comonomer of the formula

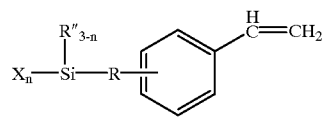

wherein R' is a divalent non-aromatic hydrocarbon group having 2 to 6 carbon atoms, R" is independently selected from alkyl groups having 1 to 10 carbon atoms or aryl groups having 6 to 10 carbon atoms, R is a divalent non-aromatic hydrocarbon group having 2 to 6 carbon atoms, X is independently a hydrolyzable group and n is independently 1, 2 or 3, and wherein the benzene ring of components (B) and (C) may optionally be substituted with at least one hydrocarbon group having 1 to 12 carbon atoms, with the proviso that $r_{AC}$ is greater than 1 and $r_{AB}$ is less than 1, wherein $r_{AB}$ is the reactivity ratio of said isobutylene in the presence of said comonomer (B) and said solvent and $r_{AC}$ is the reactivity ratio of said isobutylene in the presence of said comonomer (C) and said solvent.

2. The method according to claim 1, wherein said isopropenylphenyl comonomer has the formula

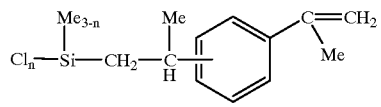

wherein Me is methyl.

3. The method according to claim 1, wherein said vinylphenyl comonomer has the formula

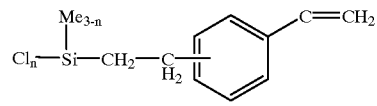

in which Me is methyl.

4. The method according to claim 1, wherein said Lewis acid is selected from $Et_2AlCl$, $EtAlCl_2$, $Me_2AlCl$, $MeAlCl_2$, $TiCl_4$ or $BCl_3$, wherein Me and Et represent methyl and ethyl, respectively.

5. The method according to claim 1, wherein each X is Cl.

6. The method according to claim 5, further comprising reacting said pseudo-telechelic silyl-functional polyisobutylene with an alcohol.

7. The method according to claim 1, wherein said isopropenylphenyl comonomer has the formula

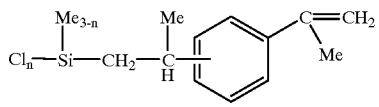

and said vinylphenyl comonomer has the formula

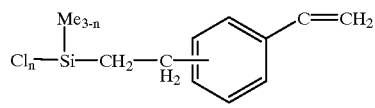

in which Me is methyl.

8. The method according to claim 7, wherein $r_{AC}$ is greater than 2 and $r_{AB}$ is less than 0.6.

9. The method according to claim 8, wherein said Lewis acid is selected from $Et_2AlCl$, $EtAlCl_2$, $Me_2AlCl$, $MeAlCl_2$, $TiCl_4$ or $BCl_3$, wherein Me and Et represent methyl and ethyl, respectively.

10. The method according to claim 7, further comprising reacting said pseudo-telechelic silyl-functional polyisobutylene with methanol.

11. The method according to claim 9, further comprising reacting said pseudo-telechelic silyl-functional polyisobutylene with an alcohol having 1 to 4 carbon atoms.

12. A pseudo-telechelic terpolymer prepared according to the method of claim 1.

13. A pseudo-telechelic terpolymer prepared according to the method of claim 6.

14. A pseudo-telechelic terpolymer prepared according to the method of claim 7.

15. A pseudo-telechelic terpolymer prepared according to the method of claim 8.

16. A pseudo-telechelic terpolymer prepared according to the method of claim 10.

17. A pseudo-telechelic terpolymer prepared according to the method of claim 11.

18. A sealant composition prepared from the pseudo-telechelic terpolymer of claim 12.

19. A sealant composition prepared from the pseudo-telechelic terpolymer of claim 16.

20. A sealant composition prepared from the pseudo-telechelic terpolymer of claim 17.

* * * * *